US012379462B1

(12) United States Patent
Lin et al.

(10) Patent No.: US 12,379,462 B1
(45) Date of Patent: Aug. 5, 2025

(54) HEIGHT MEASUREMENT DEVICE AND HEIGHT MEASUREMENT METHOD BASED ON MILLIMETER-WAVE RADAR

(71) Applicant: Airtouch Intelligent Technology (Shanghai) Co., Ltd., Shanghai (CN)

(72) Inventors: Shuiyang Lin, Shanghai (CN); Huaping Wu, Shanghai (CN); Li Lin, Shanghai (CN); Yantao Guo, Shanghai (CN); Zhilin Wang, Shanghai (CN)

(73) Assignee: Airtouch Intelligent Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/934,266

(22) Filed: Nov. 1, 2024

(30) Foreign Application Priority Data

Apr. 26, 2024 (CN) .......................... 202410513039.7
Apr. 26, 2024 (CN) .......................... 202420899601.X

(51) Int. Cl.
| G01S 7/35 | (2006.01) |
| G01S 7/00 | (2006.01) |
| G01S 13/34 | (2006.01) |
| G01S 13/86 | (2006.01) |

(52) U.S. Cl.
CPC ............... *G01S 7/35* (2013.01); *G01S 7/003* (2013.01); *G01S 13/34* (2013.01); *G01S 13/86* (2013.01)

(58) Field of Classification Search
CPC . G01S 7/003; G01S 7/35; G01S 13/34; G01S 13/86; G01S 13/88; G01S 13/887; G01S 13/888; A61B 5/11; A61B 5/1114; A61B 5/1117
See application file for complete search history.

(56) References Cited

U.S. PATENT DOCUMENTS

| 5,361,070 A * | 11/1994 | McEwan | A61B 5/0507 |
| | | | 342/21 |
| 5,905,436 A * | 5/1999 | Dwight | G08B 21/0415 |
| | | | 600/595 |
| 7,345,618 B1 * | 3/2008 | Cole | H01Q 9/27 |
| | | | 342/28 |
| 7,567,200 B1 * | 7/2009 | Osterweil | G01S 13/56 |
| | | | 342/28 |

(Continued)

Primary Examiner — Peter M Bythrow
(74) Attorney, Agent, or Firm — IPRTOP LLC

(57) ABSTRACT

A height measurement device and a height measurement method based on a millimeter-wave radar are provided. The height measurement device comprises a millimeter-wave radar module, a main controller, and a wake-up module. The wake-up module and the millimeter-wave radar module are connected to the main controller, respectively. The wake-up module activates the millimeter-wave radar module through the main controller. The millimeter-wave radar module sends a transmission signal and receives an echo signal, and obtains an intermediate-frequency signal based on the transmission signal and the echo signal. The echo signal is formed by the reflected back transmission signal after it encounters human head. The main controller applies continuous millimeter waves to sweep across the highest point of the human head and obtain height data based on the intermediate-frequency signal. When height measurement is needed, the wake-up module activates the millimeter-wave radar module, achieving non-contact, high-precision height measurement and reducing energy consumption.

19 Claims, 7 Drawing Sheets

(56) References Cited

U.S. PATENT DOCUMENTS

| | | | |
|---|---|---|---|
| 7,916,066 B1 * | 3/2011 | Osterweil | A61B 5/1117 382/115 |
| 8,009,021 B1 * | 8/2011 | Peters, Jr. | G08B 25/001 340/286.07 |
| 8,068,051 B1 * | 11/2011 | Osterweil | G01S 7/006 340/573.5 |
| 9,069,067 B2 * | 6/2015 | Bangera | H04N 21/44218 |
| 10,292,625 B2 * | 5/2019 | Shinar | A61B 5/6891 |
| 10,380,860 B2 * | 8/2019 | Amir | G08B 13/19602 |
| 11,158,179 B2 * | 10/2021 | Tunnell | G08B 27/001 |
| 12,087,144 B2 * | 9/2024 | Katz | G08B 29/22 |
| 2006/0145874 A1 * | 7/2006 | Fredriksson | G08B 21/0446 340/573.1 |
| 2012/0116252 A1 * | 5/2012 | Newman | A61B 5/1117 600/587 |
| 2014/0024917 A1 * | 1/2014 | McMahon | G01S 13/18 600/407 |
| 2014/0145848 A1 * | 5/2014 | Amir | G08B 21/0492 702/150 |
| 2016/0377704 A1 * | 12/2016 | Harash | G01S 13/0209 342/21 |
| 2021/0202078 A1 * | 7/2021 | Ford | G16H 10/60 |
| 2022/0211568 A1 * | 7/2022 | AlGhazi | A61B 5/1117 |
| 2022/0401018 A1 * | 12/2022 | Yang | A61B 5/4809 |
| 2023/0042452 A1 * | 2/2023 | Amir | G01S 13/56 |
| 2023/0055654 A1 * | 2/2023 | Amir | G01S 7/412 |
| 2023/0288536 A1 * | 9/2023 | Karnam | G01S 13/584 |
| 2024/0037908 A1 * | 2/2024 | Hazra | G01S 7/417 |
| 2024/0285189 A1 * | 8/2024 | Amir | G08B 21/043 |

\* cited by examiner

HEIGHT MEASUREMENT DEVICE AND HEIGHT MEASUREMENT METHOD BASED ON MILLIMETER-WAVE RADAR

FIELD OF THE INVENTION

The present disclosure relates to the technical field of frequency-modulated continuous wave ranging, and in particular, to a height measurement device and a height measurement method based on a millimeter-wave radar.

BACKGROUND OF THE INVENTION

Currently, height measurement devices on the market mainly use either direct contact measurement or non-contact ultrasonic measurement methods. These methods are limited by the time consuming physical contact or the environmental situations, leading to inconvenience, lower accuracy, and susceptibility to external interference.

For instance, traditional height measurement methods often require direct contact, necessitating additional tools or equipment, which can be inconvenient, especially when frequent monitoring is needed, it demands increased energy consumption. Similarly, existing ultrasonic distance measurement devices operating at frequencies between 20 and 60 kHz, are easily affected by factors such as the propagation medium, temperature, and surrounding environment, all of which impacts the stability of the measurement results and increases energy consumption, leading to resource wastage.

Therefore, a new solution for measuring human height is required to tackle these challenges.

SUMMARY OF THE INVENTION

A height measurement device and a height measurement method based on a millimeter-wave radar are provided.

Embodiments of the present disclosure provide the following technical solutions.

The height measurement device comprises a millimeter-wave radar module, a main controller, and a wake-up module.

The wake-up module and the millimeter-wave radar module are connected to the main controller, respectively.

The wake-up module is configured to activate the millimeter-wave radar module through the main controller, to transition the millimeter-wave radar module from a standby state to a working state.

The millimeter-wave radar module is configured to send a transmission signal and receive an echo signal in the working state, and to obtain an intermediate-frequency signal based on the transmission signal and the echo signal. The echo signal is formed by the reflected back transmission signal after it encounters a human head.

The main controller is configured to utilize continuous millimeter waves in order to sweep a highest point of the human head and to obtain height data based on the intermediate-frequency signal.

Preferably, the wake-up module comprises one of an infrared pair module, a voice wake-up module, and a preset radar. In a case of the infrared pair module, the infrared pair module sends an electrical signal to the main controller when detecting a human in a defined region, and the main controller activates the millimeter-wave radar module upon receiving the electrical signal from the infrared pair module. In a case of the voice wake-up module, the voice wake-up module identifies a wake-up word to activate the millimeter-wave radar module through the main controller. In a case of the preset radar, the preset radar sends the electrical signal to the main controller when detecting a human in the defined region, and the main controller activates the millimeter-wave radar module upon receiving the electrical signal from the preset radar.

Preferably, the wake-up module is integrated into the millimeter-wave radar module.

Preferably, the millimeter-wave radar module and the main controller are integrated into a millimeter-wave radar chip.

Preferably, the millimeter-wave radar module is integrated into a millimeter-wave chip, and the main controller is integrated into an MCU chip.

Preferably, the wake-up module is integrated into a millimeter-wave radar chip.

Preferably, the wake-up module is integrated into an MCU chip and is connected to the main controller.

Preferably, the height measurement device further comprises a communication module, and the communication module is connected to the main controller, and sends a height signal obtained from the main controller to other modules or devices.

Preferably, the communication module is integrated into a WIFI/BT (Bluetooth) chip.

Preferably, the height measurement device further comprises a display module, and the display module is connected to the main controller and displays the height data obtained by the main controller.

Preferably, the height measurement device further comprises a voice broadcasting module, and the voice broadcasting module is connected to the main controller, and broadcasts the height data obtained by the main controller.

Preferably, the height measurement device further comprises a storage module, and the storage module is connected to the main controller, and stores the height data obtained by the main controller.

The height measurement method comprises:
  detecting, by a wake-up module, whether a human exists in a defined region; if yes, activating a millimeter-wave radar module through the main controller and configuring the millimeter-wave radar module to be in a working state; and if no, configuring the millimeter-wave radar module to remain in a standby state;
  transmitting, by the millimeter-wave radar module, a frequency-modulated signal towards a human head below the millimeter-wave radar module, and receiving an echo signal formed from the frequency-modulated signal when it is reflected back after encountering the human head;
  performing, by the millimeter-wave radar module, a mixing operation with the frequency-modulated signal and the echo signal to obtain an intermediate-frequency signal; and
  calculating, by the main controller, the distance between the human head and the millimeter-wave radar module based on the intermediate-frequency signal to obtain the height data.

Compared with existing technologies, the present disclosure has following beneficial effects.

The height measurement method of the present disclosure incorporates the wake-up module, with both the wake-up module and the millimeter-wave radar module connected to the main controller, and forms a new architecture for height measurement. The wake-up module activates the millimeter-wave radar module through the main controller, and ensures the millimeter-wave radar module is only active during height measurement, so as to reduce unnecessary energy consumption. By using this millimeter-wave radar technology, when a human stands beneath the height measurement device, the millimeter-wave radar module and the main controller work together to measure his/her height. The height measurement method of the present disclosure not only achieves non-contact and high-precision height measurement, also reduces the overall energy consumption of the device, by activating the millimeter-wave radar module only during measurement. The height measurement method of the present disclosure is efficient, accurate, and user-friendly, offering an advanced height measurement technology for medical, commercial, and household applications.

BRIEF DESCRIPTION OF DRAWINGS

In order to more clearly illustrate the technical solutions in the embodiments of the present disclosure, the following is a brief description of the accompanying drawings to be used in the description of the embodiments. It is obvious that the following description of the accompanying drawings is only about embodiments of the present invention. For the person of ordinary skill in the art, other drawings can be obtained without creative work, according to these accompanying drawings.

DETAILED DESCRIPTION OF THE INVENTION

Figure 1:
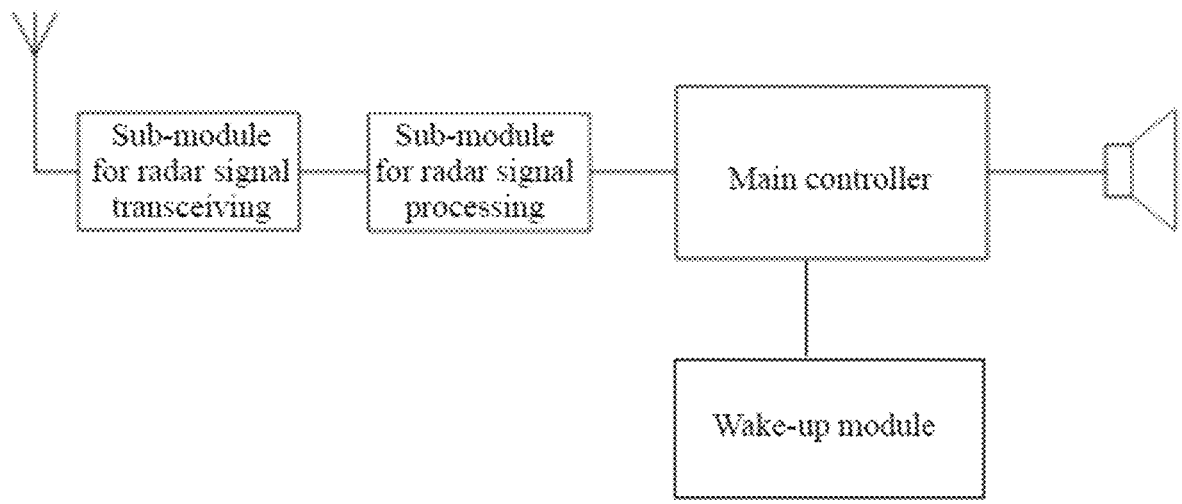
FIG. 1 shows a schematic diagram of a first height measurement device based on a millimeter-wave radar of the present disclosure.

The present disclosure will be described in further detail below with reference to the accompanying drawings.

The embodiments of the present disclosure will be described below. Those skilled can easily understand other advantages and effects of the present disclosure according to contents disclosed by the specification. The described embodiments are only part of all embodiments of the present disclosure. The present disclosure can also be implemented or applied through other different specific embodiments. Various details in this specification can also be modified or changed based on different viewpoints and disclosures without departing from the spirit of the illustrate the technical solutions more clearly present disclosure. It should be noted that the following embodiments and features of the following embodiments can be combined with each other if no conflict will result. All other embodiments that persons of ordinary skill in the art obtain without creative efforts based on the embodiments of the present disclosure also fall within the scope of the present disclosure.

It should be noted that the following describes various aspects of the embodiments within the scope of the appended claims. It should be apparent that the aspects described herein can be embodied in a wide variety of forms, and any specific structure and/or functionality described herein is merely illustrative. Those skilled in the art will understand that one aspect described herein can be implemented independently of any other aspect, and that two or more of these aspects can be combined in various ways. For example, any number and aspects described herein can be used to implement a device and/or practice a method. Additionally, the present device and/or method can be implemented using structures and/or functionalities other than one or more of the aspects described herein.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the layout of the components can also be more complicated.

Additionally, in the following description, specific details are provided to facilitate a comprehensive understanding of the embodiments. However, those skilled in the art will recognize that the practice can be carried out without these specific details.

Currently, height measurement devices on the market mainly use either contact methods or non-contact ultrasonic methods. Traditional height measurement methods often require direct contact, necessitating additional tools or equipment, which can be inconvenient, especially when frequent monitoring is needed, increasing energy consumption. Existing ultrasonic distance measurement devices, which operate at frequencies between 20 and 60 KHz, are easily affected by factors such as the propagation medium, temperature, and surrounding environment, which impacts the stability of the measurement results and increases energy consumption, leading to resource wastage. In short, traditional height measurement is constrained by either the need for physical contact or the environmental conditions, leading to inconvenience, lower accuracy, and susceptibility to external interference, thereby restricting measurement and increasing energy consumption.

Improved to the above, the present disclosure proposes a processing solution. By leveraging the high frequency, high precision, and anti-interference characteristics of millimeter-wave radar technology, the wake-up module is incorporated to activate the millimeter-wave radar module, transitioning the millimeter-wave radar module from a standby state to a working state. The millimeter-wave radar module and the wake-up module are both connected to the main controller, thereby forming a new architecture for height measurement. The wake-up module activates the millimeter-wave radar module when a human stands beneath the height measurement device, thereby initiating the height measurement process. This process is facilitated through the millimeter-wave radar module and the main controller. This solution not only mitigates the shortcomings of traditional measurement methods but also provides a more reliable solution for height measurement. Furthermore, it reduces the energy consumption of the height measurement device, by activating the millimeter-wave radar module only during measurement, thereby conserving energy.

The following description, in conjunction with the accompanying drawings, elucidates the technical solutions provided by the embodiments of the present disclosure.

As shown in FIG. 1, the present disclosure provides a height measurement device based on a millimeter-wave radar. The height measurement device comprises a millimeter-wave radar module (including sub-modules for radar signal transceiving and radar signal processing), a main controller, and a wake-up module. The wake-up module and the millimeter-wave radar module are connected to the main controller, respectively.

The wake-up module is configured to wake up the millimeter-wave radar module under specific conditions, for example in this case, when height measurement is needed. The wake-up module can detect whether a human appears in a defined region using some specific methods, thereby transitioning the millimeter-wave radar module from a standby state to a working state for height measurement. The millimeter-wave radar module remains in the standby state until it is activated, ensuring it only operate when necessary. This prevents the millimeter-wave radar module from continuously running in height measurement mode (i.e., in the working state), thereby avoiding unnecessary high power consumption and effectively addressing the issue of increased energy consumption caused by continuous operation.

The millimeter-wave radar module is configured to send a transmission signal and receive an echo signal in the working state, and to obtain an intermediate-frequency signal based on the transmission signal and the echo signal. The echo signal is formed from the reflected back transmission signal after encountering a human head. The main controller is configured to sweep continuous millimeter waves through the highest point of the human head and obtain the height data (i.e., measurement of human height) based on the intermediate-frequency signal.

The main controller adopts the frequency modulated continuous wave (FMCW) ranging principle to measure human height.

Specifically, the main controller employs radar ranging technology based on frequency-modulated continuous millimeter-wave signals. More specifically, an FMCW radar transmits a frequency-modulated signal, and then sends the frequency-modulated signal through its transmitting antenna to a target area (i.e., the defined region); when the frequency-modulated signal encounters a target, part of the energy is reflected back, forming an echo signal; and a receiving antenna of the FMCW radar captures this echo signal and mixes it with the transmitted frequency-modulated signal to produce an intermediate-frequency signal. A frequency of the intermediate-frequency signal corresponds to a frequency difference between the frequency-modulated signal and the echo signal, this difference is related to the distance between the target and the FMCW radar. The distance between the target and the FMCW radar can be calculated based on the frequency of the intermediate-frequency signal, and the frequency difference between the frequency-modulated signal and the echo signal is directly proportional to the distance between the target and the FMCW radar. Therefore, the distance between the target and the FMCW radar is calculated using the frequency difference with the following formula:

$$D = \frac{c \times \Delta f}{2 \times B}$$

wherein D represents the distance, c represents lightspeed, $\Delta f$ represents frequency difference, and B represents sweep bandwidth.

The present disclosure utilizes the millimeter-wave radar to measure human height, offering the following advantages. 1. High-precision measurement: the millimeter-wave radar technology can achieve millimeter-level accuracy, far surpassing traditional methods. 2. Unaffected by environmental factors: the millimeter-wave radar technology is not interfered by environmental conditions like light and temperature, so the measurement is stable and accurate. 3. Non-contact design: users can simply stand under the height measurement device to get their height measured, making it very convenient.

Additionally, the wake-up module activates the millimeter-wave radar module through the main controller only when measurement is needed, reducing unnecessary energy consumption by the millimeter-wave radar module, thereby effectively addressing the issue of increased energy consumption caused by continuous operation.

Given the variation in of human head shapes, with some being flat-topped and others pointed, the height measurement of the present disclosure adopts the method of applying frequency-modulated continuous millimeter-wave signals. When a human stands under the height measurement device, a sub-module of the millimeter-wave radar module for radar signal transceiving is configured to send the transmission signal and receive the echo signal in the working state. These signals are then processed by a sub-module of the millimeter-wave radar module for radar signal processing, using a sampling frequency of an analog-to-digital converter (ADC) of the intermediate-frequency signal, such that the millimeter-wave radar module can capture the intermediate-frequency signal corresponding to the highest point of the human head. The main controller then receives this intermediate-frequency signal and ultimately determines the human's height.

By integrating millimeter-wave radar technology with the wake-up module, the height measurement method of the present disclosure provides a new architecture for height measurement, by connecting the wake-up module to the millimeter-wave radar module through the main controller. When measuring human height, the wake-up module activates the millimeter-wave radar module through the main controller, initiating the height measurement process. As a result, when a human stands beneath the height measurement device, the millimeter-wave radar module and the main controller work together to measure the human's height. The height measurement method of the present disclosure is efficient, accurate, and user-friendly. It not only addresses the shortcomings of traditional methods but also saves energy by activating the millimeter-wave radar module only when needed, offering an advanced height measurement technology for medical, commercial, and household applications.

The wake-up module comprises one of an infrared pair module, a voice wake-up module, and a preset radar. The infrared pair module is configured to send an electrical signal to the main controller when detecting a human in the defined region, and the main controller is configured to activate the millimeter-wave radar module upon receiving the electrical signal from the infrared pair module. The voice wake-up module is configured to identify a wake-up word, to activate the millimeter-wave radar module through the main controller. The preset radar is configured to send the electrical signal to the main controller when detecting a human in the defined region, and the main controller is configured to activate the millimeter-wave radar module upon receiving the electrical signal from the preset radar. The preset radar, such as a low-power microwave radar sensor, activates the millimeter-wave radar module for height measurement through the main controller, after detecting human motion. Similar to the infrared pair module with a working current of 10 μA, the preset radar adopts other low-power microwave radar sensors with an operating current of 10-200 μA, and can even be as low as the microampere level.

Alternatively, the wake-up module is integrated into the millimeter-wave radar module.

Figure 2:
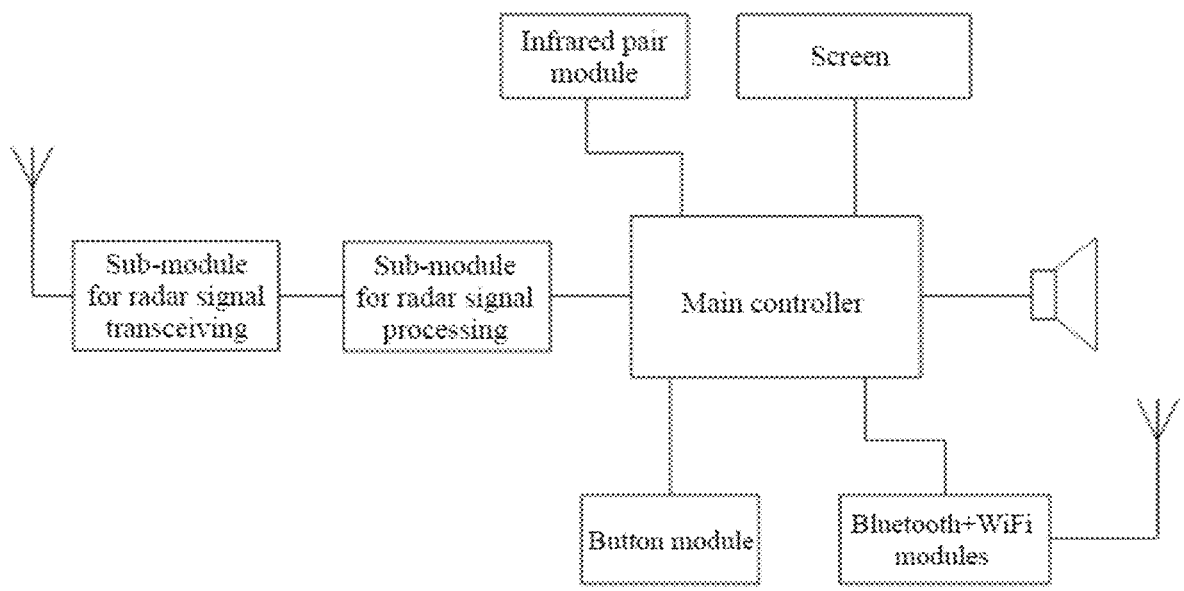
FIG. 2 shows a schematic diagram of a second height measurement device of the present disclosure.

As shown in FIG. 2, the infrared pair module serves as the wake-up module, which is connected to the main controller for detecting the human appearance. The main controller activates the millimeter-wave radar module upon receiving the electrical signal from the infrared pair module.

In one embodiment, the infrared pair module serves as a wake-up trigger for the millimeter-wave radar module, operating based on its sensitivity to infrared radiation. The infrared pair module detects infrared radiation in the environment (i.e., around the defined region) and generates an electrical signal when it detects a target or active entity (e.g., a human). When the target or active entity is detected, the infrared pair module sends the electrical signal to the main controller. The main controller receives the electrical signal and determines whether to activate the millimeter-wave radar module based on the signal status. The main controller can intelligently decide when to wake up the millimeter-wave radar module. The main controller activates the millimeter-wave radar module when it determines that the target or active entity exists in the defined region. In this way, the millimeter-wave radar module only operates when needed, effectively addressing the issue of increased energy consumption caused by continuous operation and avoiding unnecessary energy use.

When the voice wake-up module serves as the wake-up module, it utilizes voice wake-up technology to analyze audio data input by a user, to determine if the audio data contains a specific wake-up word (such as measure height), thereby triggering the main controller to activate the millimeter-wave radar module. The voice wake-up module is configured to identify the wake-up word. When the user says the wake-up word, the main controller activates the millimeter-wave radar module to transition the millimeter-wave radar module from the standby state to the working state, effectively addressing the issue of increased energy consumption caused by continuous operation and avoiding unnecessary energy use.

Additionally, the wake-up module can be integrated into the millimeter-wave radar module. Based on the radar's low-power detection mode (i.e., in the standby state), the millimeter-wave radar module can sweep frequencies at different frame rates. Normally, the millimeter-wave radar module operates in a human motion detection mode (i.e., the low-power detection mode), sweeping frequencies at 4 frames per second or lower; when the millimeter-wave radar module detects human motion, it transitions to a height measurement mode (i.e., in the working state), sweeping frequencies at 16 frames per second or higher, with a wider sweep bandwidth and more chirps per frame. The mode transition is implemented by a system-on-chip (SOC) of the millimeter-wave radar, enabling the millimeter-wave radar module to transition from the low-power standby state to the working state. In this way, the millimeter-wave radar module only operates when needed, effectively addressing the issue of increased energy consumption caused by continuous operation and avoiding unnecessary energy use.

The wake-up module can adopt other low-power radars, such as other low-power microwave radar sensors, to detect human motion and wake up the millimeter-wave radar module for height measurement. Compared with the infrared pair module, the low-power microwave radar sensors have a much lower working current, ranging from 10 μA to 200 μA, and can even be as low as a single digit microampere level. Therefore, the height measurement method of the present disclosure adds the wake-up module based on the connection structure of the millimeter-wave radar module and the main controller, effectively addressing the issue of increased energy consumption caused by continuous operation during height measurement and avoiding unnecessary energy use.

In the present disclosure, the modules of the height measurement device utilize chips to achieve height measurement. In some embodiments, a millimeter-wave chip and a microcontroller unit (MCU) chip are utilized separately to implement functions of the millimeter-wave radar module and the main controller. Specifically, the millimeter-wave radar module is integrated into the millimeter-wave chip, and the main controller is integrated into the MCU chip.

In some other embodiments, the millimeter-wave radar module and the main controller are integrated into the SOC of the millimeter-wave radar. The processing related to the millimeter-wave chip and the MCU chip can be concentrated into one SOC of the millimeter-wave radar, while the related control and height processing can be executed by a central processing unit (CPU) of the SOC of the millimeter-wave radar.

Specifically, by leveraging mature complementary metal oxide semiconductor (CMOS) technology and fully utilizing mixed-signal technology, a processor, a millimeter-wave transceiver module, a radar intermediate-frequency module, and a radar signal processing module are integrated into the SOC of the millimeter-wave radar (for example, model AT6010 chips from Airtouch Intelligent Technology (Shanghai) Co., Ltd.), enabling a more miniaturized product design.

Figure 4:
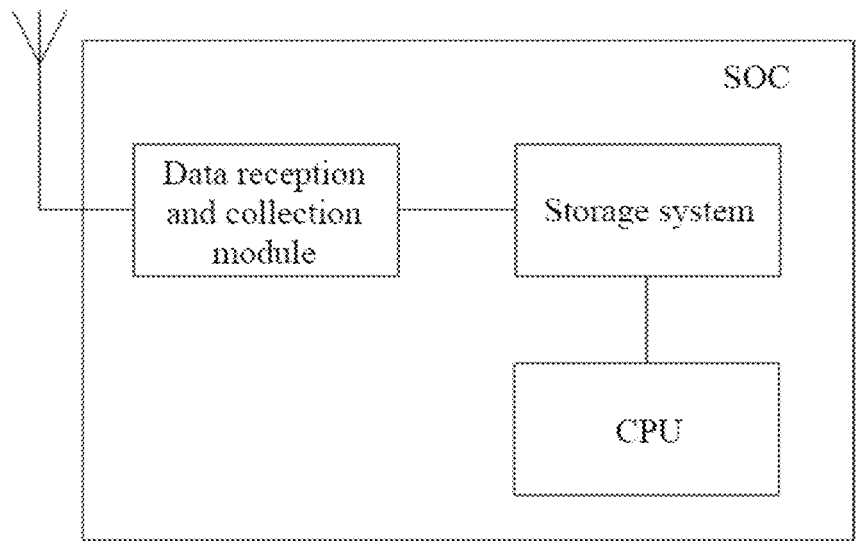
FIG. 4 shows a schematic diagram of a millimeter-wave radar chip of the present disclosure.

As shown in FIG. 4, the SOC comprises a data reception and collection module, a storage system, and a CPU. Specifically, a millimeter-wave radar frequency signal is received and processed by the data reception and collection module (e.g., millimeter-wave radar module) to be an analog intermediate-frequency signal, then the analog intermediate-frequency signal is converted into a digital intermediate-frequency signal by an ADC module within the data reception and collection module, and then the digital intermediate-frequency signal is output to the storage system. The storage system (e.g., storage module corresponding to the main controller) receives the digital intermediate-frequency signal from the data reception and collection module and stores it in the system's memory for subsequent algorithm processing. The CPU (e.g., main controller or integrated microcontroller) reads radar intermediate-frequency data stored in the memory for algorithm processing, including filtering, 1D-FFT/2D-FFT (Fast Fourier Transform) conversion, and distance measurement algorithms.

In the present disclosure, the height measurement device, which uses the millimeter-wave radar module and the main controller, further comprises a wake-up module. This wake-up module can be implemented in two ways based on the settings of the millimeter-wave radar module and the main controller, that is, the wake-up module can either be integrated into a millimeter-wave radar chip or integrated into the MCU chip and connected to the main controller.

The wake-up module can be integrated into the SOC of the millimeter-wave radar. The wake-up module comprises one of the infrared pair module, the voice wake-up module, and the preset radar, and can be integrated into the MCU chip and connected to the main controller, thereby forming a new architecture for height measurement.

In the present disclosure, the height measurement device further comprises a display module, a voice broadcasting module, and a storage module. The display module is connected to the main controller, to display the height data obtained by the main controller. The voice broadcasting module is connected to the main controller, to broadcast the height data obtained by the main controller. The storage module is connected to the main controller, to store the height data obtained by the main controller. The connections between the modules can either refer to integrated connections if the modules are on a single chip, or to electrical connections if the modules are on different chips.

Figure 5:
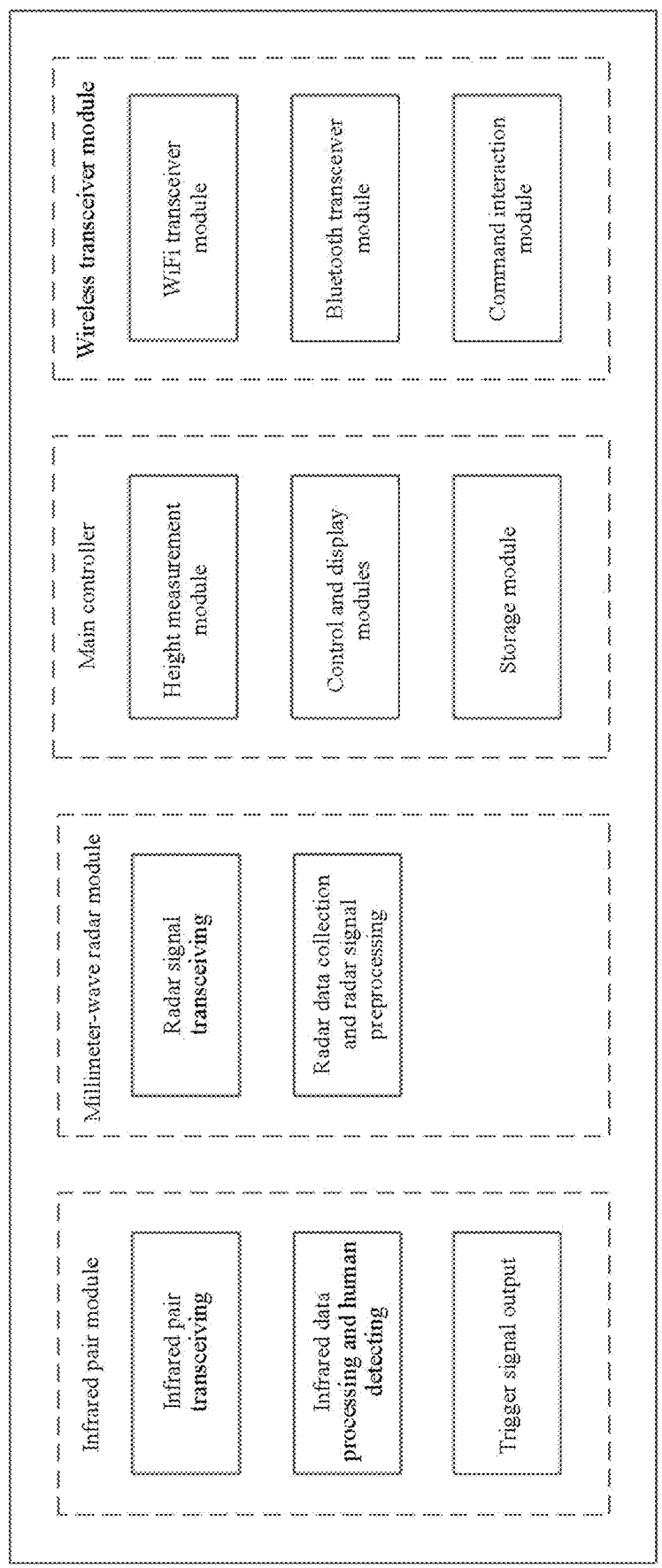
FIG. 5 shows a schematic diagram of the internal modules in the height measurement device of the present disclosure.

With reference to FIG. 4, the modules mentioned above are integrated into the millimeter-wave radar chip, that is, the height measurement device further comprises the display module, the voice broadcasting module, and the storage module. As shown in FIG. 5, the height measurement device of the present disclosure comprises the infrared pair module (specifically, the wake-up module includes one of the infrared pair module, the voice wake-up module, other low-power radars, and the wake-up module within the millimeter-wave radar module), the millimeter-wave radar module, the main controller, and a communication module (such as a wireless transceiver module). Embodiments of the present disclosure are described taking the infrared pair module being a wake-up module as an example.

The infrared pair module is mainly used to send the electrical signal to the main controller when the target or active entity is detected, and the main controller receives the electrical signal and determines whether to activate the millimeter-wave radar module based on the signal status, thereby waking up the millimeter-wave radar module. Due to the low power consumption of the infrared pair module, it can remain active continuously; when the infrared pair module detects the target or active entity, it activates the millimeter-wave radar module. Similarly, the voice wake-up module and other low-power radars have low power consumption and remain active continuously; when the wake-up word is identified or the human motion is detected, they activate the millimeter-wave radar module.

The millimeter-wave radar module is mainly used for radar signal transceiving, radar data collection, and radar signal preprocessing.

The main controller is mainly used to apply a height measurement algorithm to data that has undergone radar signal preprocessing, to handle height measurement, control processing, display and calibrate the height data, and store the height data.

Figure 3:
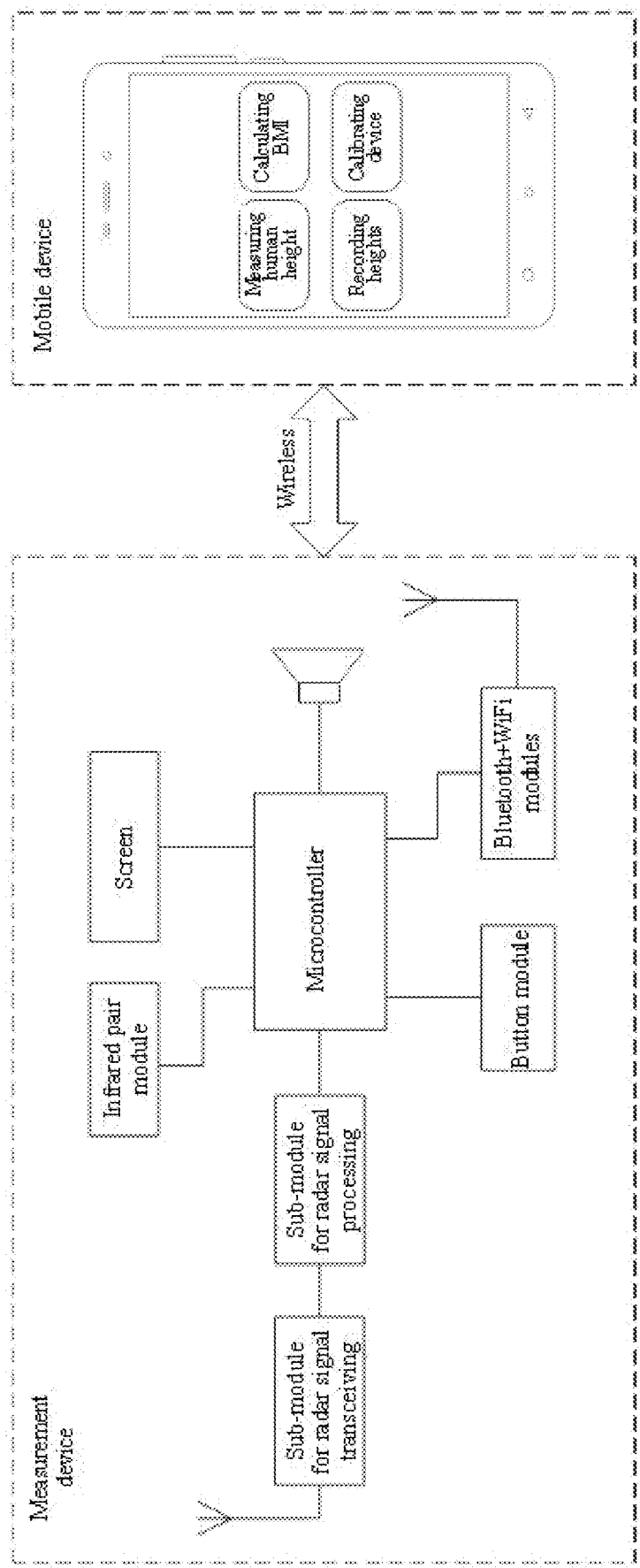
FIG. 3 shows a schematic diagram of a third height measurement device of the present disclosure.

The wireless transceiver module is responsible for data transmission and interaction with mobile devices. As an example, when a WiFi transceiver module serves as the wireless transceiver module, the WiFi transceiver module sends the height data to the mobile devices for management. As another example, when a Bluetooth transceiver module serves as the wireless transceiver module, the Bluetooth transceiver module sends the height data to the mobile devices for management. As yet another example, when a command interaction module serves as the wireless transceiver module, the command interaction module is responsible for data interaction between a WiFi/BT (Bluetooth) module and a main controller module. As shown in FIG. 3, a height calculation result (i.e., the height data) can be transmitted to other modules via wired means or to mobile devices (such as phones and tablets) via wireless means.

Specifically, the millimeter-wave radar module has following functions. a. Radar signal transceiving: the height measurement device of the present disclosure is equipped with a 60 GHz millimeter-wave radar chip, and a signal generated by a waveform generator forms a frequency-modulated continuous millimeter-wave signal through linear frequency modulation, which is then transmitted through radar antenna; when the frequency-modulated continuous millimeter-wave signal encounters an object (such as a human body), it is reflected back, and the reflected signal is then received by a receiving module; the frequency-modulated continuous millimeter-wave signal and the reflected signal are mixed to generate an intermediate-frequency signal; the waveform generator is configured with a wide sweep bandwidth to improve the accuracy of height measurement; as an example, the waveform generator has a 5 GHz sweep bandwidth (i.e., 59-64 GHZ). b. Radar data collection and radar signal preprocessing: the radar receives raw data, which includes both valid signals and various interference signals; the raw data utilizes high-pass and low-pass filters in an analog front end to perform preliminary signal processing; after filtering, the intermediate-frequency signal is converted into a digital signal by the ADC module for further digital signal processing.

Specifically, the main controller has following functions. A). Height measurement module: it measures human height by invoking a height measurement algorithm library; the height measurement algorithm library utilizes the FMCW ranging principle to obtain the distance, corresponding to the antenna-to-human transmission and the reflected echo, thereby obtaining the height data based on the intermediate-frequency signal; as an example, the antenna-to-human transmission refers to the signal transmission between the antenna and the human head; or, the height measurement module utilizes the continuous millimeter waves to sweep the highest point of the human head and obtain the height data based on the intermediate-frequency signal. B). Control and display modules: the control module manages the height, measurement device's functions, such as power-turn-on through a button module, calibration, measurement initiation, and wake-up button activation; the display module shows wireless connection status, height data, and other information. C). a Storage module: it stores radar calibration data and other user data.

The height measurement device of the present disclosure has a screen display function and a voice broadcast function, and can be used as a standalone device.

The communication module of the present disclosure is integrated into a WIFI/BT chip and is connected to the main controller, to send a height signal obtained from the main controller to other modules or devices (such as the mobile device shown in FIG. 3, which may include laptops, computers, mobile phones, etc.).

In the present disclosure, the height measurement device utilizes three chips, including the millimeter-wave chip, the MCU chip, and the WIFI/BT chip, to achieve height measurement. Alternatively, the height measurement device can utilize two chips, by integrating the millimeter-wave chip and the MCU chip processing into one SOC, and the related control and height algorithm processing can be executed in the CPU of the SOC.

The height measurement method of the present disclosure comprises steps S901 to S904. S901 includes detecting, by a wake-up module, whether a human exists in a defined region; if yes, activating a millimeter-wave radar module through a main controller and configuring the millimeter-wave radar module to be in a working state; and if no, configuring the millimeter-wave radar module to remain in a standby state. S902 includes transmitting, by the millimeter-wave radar module, a frequency-modulated signal towards a human head below the millimeter-wave radar module, and receiving an echo signal formed by the frequency-modulated signal encountering the human head and being reflected back. S903 includes performing, by the millimeter-wave radar module, a mixing operation with the frequency-modulated signal and the echo signal to obtain an intermediate-frequency signal. S904 includes calculating, by the main controller, a distance between the human head and the millimeter-wave radar module based on the intermediate-frequency signal to obtain height data.

Specifically, in S901, the wake-up module is configured to detect whether a human exists in the defined region. The defined region refers a certain area around the height measurement device, such as below the device, but is not limited to this area and can be defined based on actual conditions.

The wake-up module can operate using different wake-up methods. For example, the wake-up module utilizes the sensitivity of the human body to infrared radiation, and the infrared pair module senses the infrared radiation in the defined region. Once a human is detected, such as when a human enters the defined region, the electrical signal generated by the infrared pair module is transmitted to the main controller. The main controller receives the electrical signal and determines whether to activate the millimeter-wave radar module based on the signal status. The main controller can intelligently decide when to wake up the millimeter-wave radar module. The main controller activates the millimeter-wave radar module when it determines that the target or active entity exists in the defined region. Conversely, if the infrared pair module does not detect a human, the millimeter-wave radar module remains in the standby state.

Figure 7:
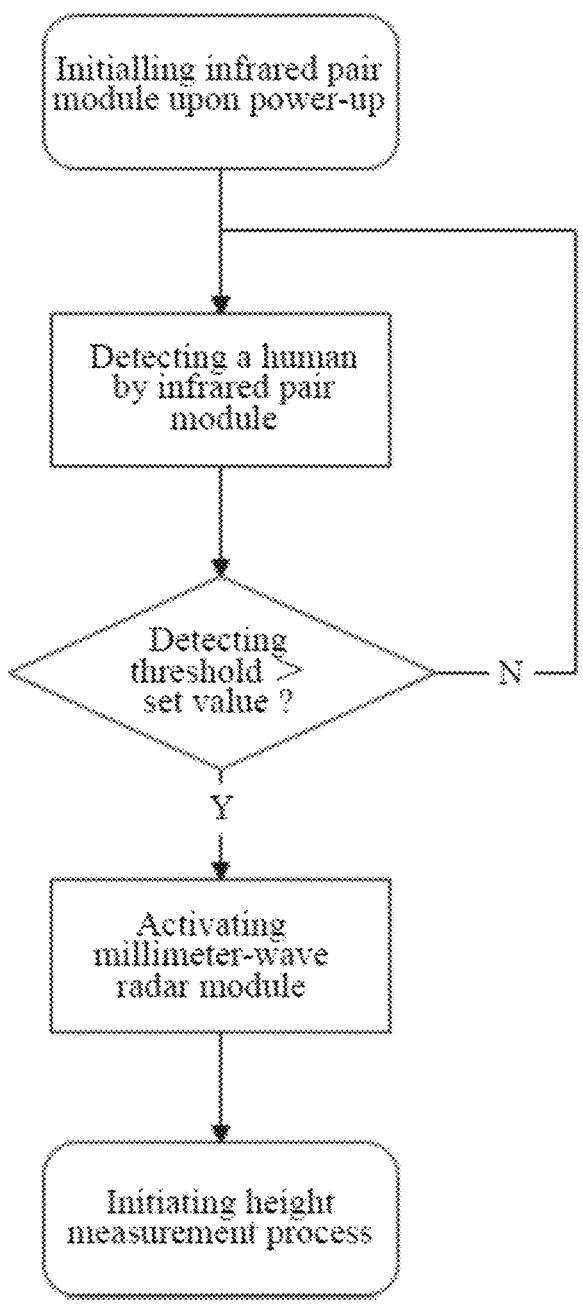
FIG. 7 shows a flowchart illustrating a method for activating the millimeter-wave radar module of the present disclosure.

As shown in FIG. 7, the infrared pair module initializes upon power-up, including setting a threshold for detecting human existence and motion (or, a detecting threshold).

When a human is detected, the infrared pair module remains active after power-up initialization, and when an object approaches the infrared pair module, the intensity of the reflected infrared light changes, causing a current change in the receiving circuit. The received current change signal is amplified and processed by a signal processing unit, ultimately outputting a detection status. Then the millimeter-wave radar module is activated for height measurement, and when the threshold for detecting human existence and motion exceeds a set value, the millimeter-wave radar module enters its working state. Otherwise, the millimeter-wave radar module remains in the standby state.

When the voice wake-up module serves as the wake-up module, it utilizes voice wake-up technology to analyze the audio data input by a user, to determine if the audio data contains the specific wake-up word (such as measure height), thereby triggering the main controller to activate the millimeter-wave radar module. The voice wake-up module is configured to identify the wake-up word. When the user says the wake-up word, the main controller activates the millimeter-wave radar module to transition the millimeter-wave radar module from the standby state to the working state. Conversely, if the voice wake-up module does not identify the wake-up word, the millimeter-wave radar module remains in the standby state.

Additionally, the wake-up module can be integrated into the millimeter-wave radar module. Based on the radar's low-power detection mode, the millimeter-wave radar module usually operates in the human motion detection mode, sweeping frequencies at 4 frames per second or lower; when the millimeter-wave radar module detects human motion, it transitions to the height measurement mode, sweeping frequencies at 16 frames per second or higher, with a wider sweep bandwidth and more chirps per frame, transitioning the millimeter-wave radar module from the standby state to the working state. If the millimeter-wave radar module remains in the standby state, it achieves low energy consumption.

The wake-up module can adopt other low-power radars, such as other low-power microwave radar sensors, to detect human motion and wake up the millimeter-wave radar module for height measurement.

In this way, the millimeter-wave radar module only operates when needed, effectively addressing the issue of increased energy consumption caused by continuous operation and avoiding unnecessary energy use.

Figure 6:
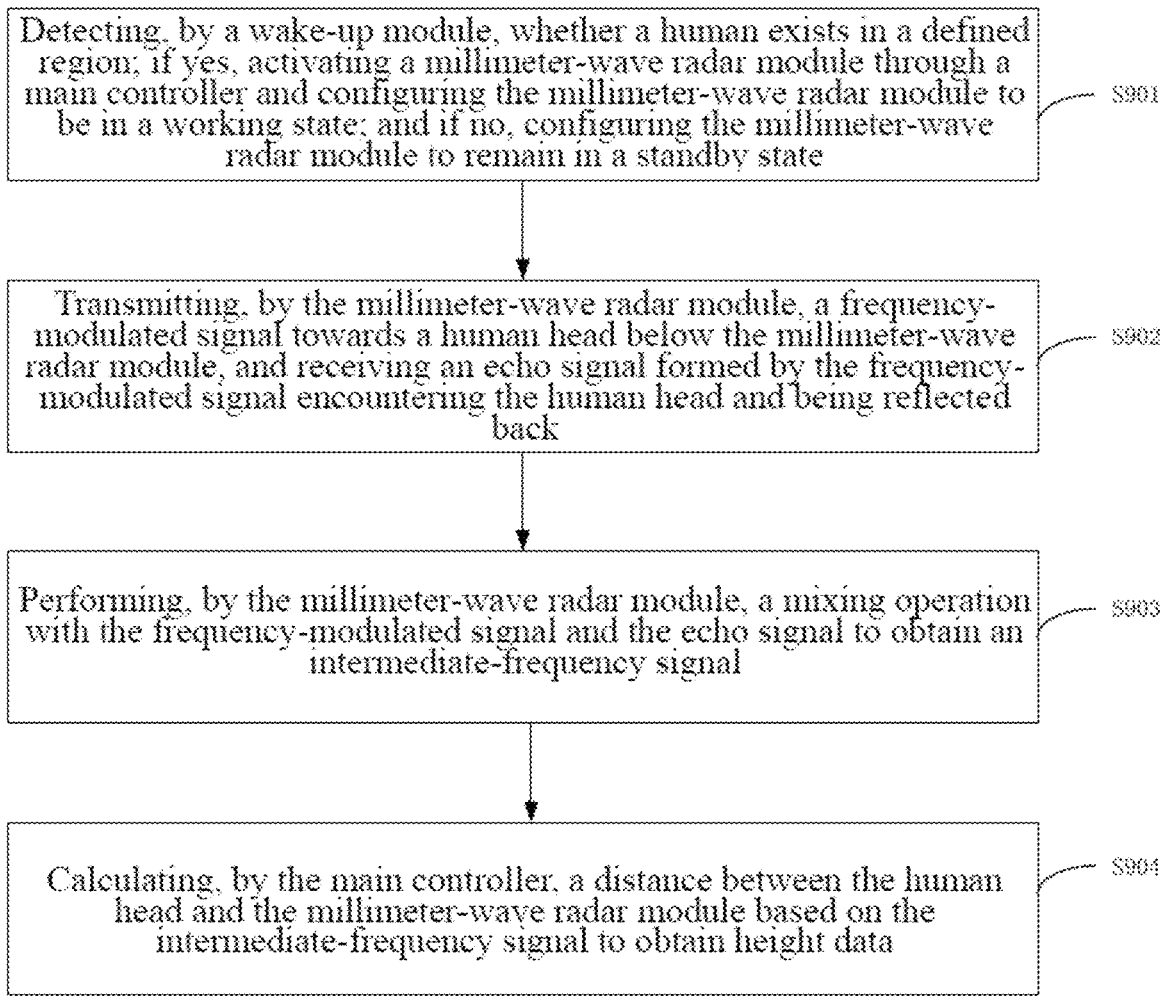
FIG. 6 shows a flowchart of the height measurement method based on the millimeter-wave radar of the present disclosure.
Figure 8:
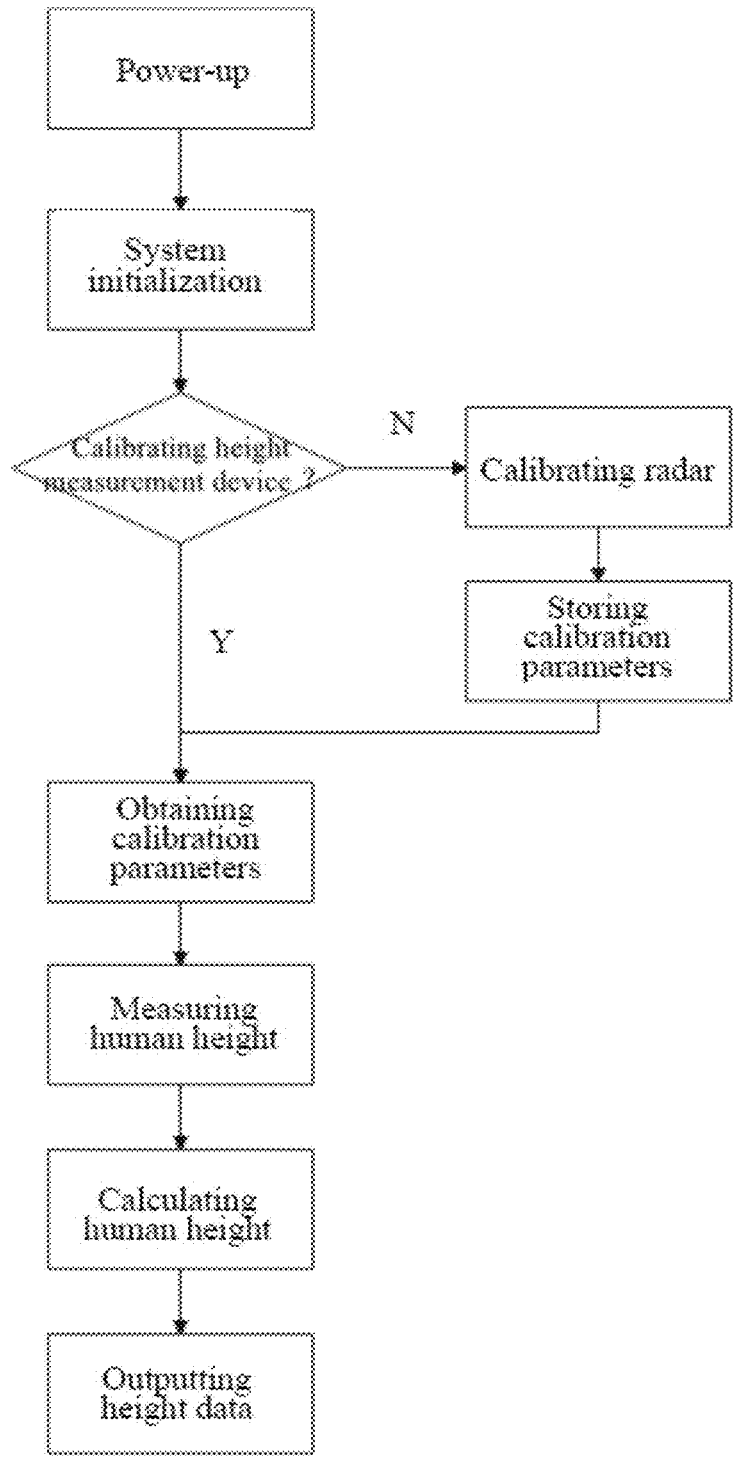
FIG. 8 shows a flowchart illustrating a method for measuring human height using the millimeter-wave radar.

As shown in FIGS. 6 and 8, the height measurement method of the present disclosure utilizes the FMCW ranging principle, the FMCW radar transmits the frequency-modulated signal, and then sends the frequency-modulated signal through its transmitting antenna to the target area; when the frequency-modulated signal encounters a target (such as a human, especially a human head), part of the energy is reflected back, forming the echo signal; and the receiving antenna of the FMCW radar captures this echo signal and mixes it with the transmitted frequency-modulated signal to produce the intermediate-frequency signal. The frequency of the intermediate-frequency signal corresponds to the frequency difference between the frequency-modulated signal and the echo signal, which is related to the distance between the target and the FMCW radar. Therefore, the height measurement method of the present disclosure is implemented by performing the steps S901 to S904. The distance between the target and the FMCW radar can be calculated based on the frequency of the intermediate-frequency signal, and the frequency difference between the frequency-modulated signal and the echo signal is directly proportional to the distance between the target and the FMCW radar. Therefore, the distance between the target and the FMCW radar is calculated using the frequency difference, thereby achieving height measurement.

Radar initialization includes configuring frequency-sweep parameters for the waveform generator. To enhance the accuracy of the height measurement device, the frequency-sweep parameters are configured as follows: a sweep bandwidth of 5 GHz, a chirp (coded pulse modulation) slope of 90.88 MHz/us, and a frame rate of 20 FPS. Other initializations include MCU system initialization, WIFI/BT module initialization, and more. For radar calibration and data updates, radar calibration markers are read from a non-volatile memory; if the height measurement device has not been calibrated, it enters a calibration program and stores calibration parameters to the non-volatile memory; and if the height measurement device has been calibrated, it directly reads a calibration value (i.e., calibration parameters) from the non-volatile memory.

In S904, the height measurement is carried out by starting the radar frequency sweep to obtain sweep data (or, radar data), filtering, based on signal characteristics, the radar data by appropriate high-pass and low-pass filters, and invoking the height measurement algorithm library to determine the distance between the radar antenna and the human head. For final height calculation, multiple sets of distance data, from the radar antenna to the highest point of the human head, are collected for calculating a middle value based on the median method, which is then combined with the calibration value to obtain the height data.

For result output, the height data can be displayed on the device's screen or announced via voice; or the height data can be transmitted to other modules through a physical communication port or sent to a mobile device via BT/WIFI modules for height management and other purposes.

In summary, by utilizing millimeter-wave radar technology, the height measurement method of the present disclosure achieves non-contact height measurement, enhancing both comfort and convenience. By integrating the wake-up module, the height measurement method effectively addresses the issue of increased energy consumption caused by continuous operation and avoiding unnecessary energy use.

Specifically, the power consumption issue is resolved by using the infrared pair module to activate the millimeter-wave radar module. The infrared pair module, which has low power consumption, can remain active continuously, while the millimeter-wave radar module, which typically consumes more power, only activates when necessary, effectively reducing power consumption. Similarly, working logics of the voice wake-up module and other low-power radars are similar and will not be elaborated here.

The height measurement method of the present disclosure implements radar calibration and data storage. By calibrating the radar, it enhances the accuracy of height measurement, and by storing the calibration data, it speeds up the startup time of the height measurement device. A 60 GHz millimeter-wave radar chip, as a key component, is the core technology for achieving high-precision height measurement, providing high-precision measurement capabilities for the human height.

The height measurement method of the present disclosure implements data transmission and system management, featuring the design and implementation of data transmission protection and module management. The integrated data transmission module allows the height data to be easily transmitted to external devices, such as mobile apps, computers, etc., enabling real-time management of height information.

The height measurement method of the present disclosure can be used in various fields such as healthcare, commercial statistics, and school health education, offering broad practical application values.

The similar parts of the various embodiments in this specification can be referred to each other, with each embodiment focusing on the differences from other embodiments. For device embodiments described later, since they correspond to methods, the descriptions are relatively simple, and the relevant parts can be referred to method embodiments.

The above embodiments are merely illustrative. Any changes or replacements that can be easily thought of by those skilled in the art within the technical scope disclosed in the present disclosure should be included in the scope of the present disclosure. Therefore, the scope of the present disclosure is subject to the protection scope defined in claims.

The invention claimed is:

1. A height measurement device based on a millimeter-wave radar, comprising a millimeter-wave radar module, a main controller, and a wake-up module integrated into the millimeter-wave radar module,
   wherein the wake-up module and the millimeter-wave radar module are connected to the main controller, respectively;
   wherein the wake-up module activates the millimeter-wave radar module through the main controller, and transitions the millimeter-wave radar module from a standby state to a working state;
   wherein the millimeter-wave radar module sends transmission signals and receive corresponding echo signals in the working state, and obtains intermediate-frequency signals based on the transmission signals and the echo signals, wherein the echo signals are formed from reflected back transmission signals when encountering a human head directly below the millimeter-wave radar; and
   wherein the main controller applies continuous millimeter radar waves to sweep across the human head to obtain radar data, filter the radar data based on signal characteristics by high-pass and low-pass filters to obtain a target intermediate-frequency signal corresponding to a highest point of the human head, and invoke a height measurement algorithm library to obtain height data based on the target intermediate-frequency signal.

2. The height measurement device according to claim 1, wherein the wake-up module comprises an infrared pair module and a preset radar,
   wherein in a case of the infrared pair module, the infrared pair module sends an electrical signal to the main controller when detecting a human in a defined region, and the main controller activates the millimeter-wave radar module upon receiving the electrical signal from the infrared pair module;
   wherein in a case of the preset radar, the preset radar sends the electrical signal to the main controller when detecting a human in the defined region, and wherein the main controller activates the millimeter-wave radar module upon receiving the electrical signal from the preset radar.

3. The height measurement device according to claim 1, wherein the millimeter-wave radar module and the main controller are integrated into a millimeter-wave radar chip.

4. The height measurement device according to claim 1, wherein the millimeter-wave radar module is integrated into a millimeter-wave chip, and wherein the main controller is integrated into an MCU chip.

5. The height measurement device according to claim 1, wherein the wake-up module is integrated into a millimeter-wave radar chip;
   or,
   wherein the wake-up module is integrated into an MCU chip and is connected to the main controller.

6. The height measurement device according to claim 1, further comprising a communication module, wherein
   the communication module is connected to the main controller, and sends a height signal obtained from the main controller to other modules or devices.

7. The height measurement device according to claim 6, wherein the communication module is integrated into a WIFI/BT (Bluetooth) chip.

8. The height measurement device according to claim 1, further comprising:
   a display module, wherein the display module is connected to the main controller and displays the height data obtained by the main controller;
   and/or, a voice broadcasting module, wherein the voice broadcasting module is connected to the main controller, and broadcasts the height data obtained by the main controller.

9. The height measurement device according to claim 1, further comprising a storage module, wherein
the storage module is connected to the main controller, and stores the height data obtained by the main controller.

10. A height measurement method based on a millimeter-wave radar, comprising:
detecting, by a wake-up module, whether a human appears in a defined region; if yes, activating a millimeter-wave radar module through a main controller and configuring the millimeter-wave radar module to be in a working state; and if no, configuring the millimeter-wave radar module to remain in a standby state; wherein the wake-up module is integrated into the millimeter-wave radar module;
transmitting, by the millimeter-wave radar module, frequency-modulated signals towards a human head directly below the millimeter-wave radar module, receiving corresponding echo signals formed by the reflected back frequency-modulated signals after encountering the human head;
performing, by the millimeter-wave radar module, a mixing operation with the frequency-modulated signals and the echo signals to obtain intermediate-frequency signals; filtering, based on signal characteristics, the intermediate-frequency signals by high-pass and low-pass filters to obtain a target intermediate-frequency signal corresponding to a highest point of the human head; and
calculating, by the main controller, a distance between the highest point of the human head and the millimeter-wave radar module using a height measurement algorithm library based on the target intermediate-frequency signal to obtain height data.

11. The height measurement device according to claim 1, further comprising a waveform generator, wherein the frequency-sweep parameters of the waveform generator comprise a sweep bandwidth of 5 GHZ, a chirp slope of 90.88 MHz/us, and a frame rate of 20 FPS.

12. The height measurement device according to claim 11, wherein the sweep bandwidth of the waveform generator ranges from 59 to 64 GHz.

13. The height measurement device according to claim 1, wherein the height measurement device performs a radar calibration and data updating before height measurement; wherein if the height measurement device has not been calibrated, the height measurement device enters a calibration program and stores calibration parameters to a non-volatile memory; and if the height measurement device has been calibrated, the height measurement device reads the calibration parameters from the non-volatile memory.

14. The height measurement device according to claim 3, wherein the millimeter-wave radar chip is a 60 GHz millimeter-wave radar chip.

15. The height measurement device according to claim 1, wherein the height data is obtained by collecting multiple sets of distance data from a radar antenna to the highest point of the human head to calculate a middle value based on a median method, and combining the middle value with a calibration value.

16. The height measurement device according to claim 1, wherein the infrared pair module initializes upon power-up, including setting a threshold for detecting human existence and motion; wherein when the threshold for detecting human existence and motion exceeds a set value, the millimeter-wave radar module enters the working state.

17. The height measurement device according to claim 2, wherein the preset radar is a low-power microwave radar sensor with an operating current of 10-200 µA.

18. The height measurement device according to claim 1, wherein the millimeter-wave radar module performs frequency sweeping at a rate of 4 frames per second or lower when in the standby state, and at a rate of 16 frames per second or higher when in the working state.

19. The height measurement device according to claim 1, wherein the wake-up module comprises a voice wake-up module, and the voice wake-up module identifies a wake-up word to activate the millimeter-wave radar module through the main controller.

\* \* \* \* \*